US012512940B2

United States Patent
Krishnamoorthy et al.

(10) Patent No.: US 12,512,940 B2
(45) Date of Patent: Dec. 30, 2025

(54) ENHANCED MAC-CE AND RRC IE FOR MULTI-CARRIER CONFIGURATIONS

(71) Applicant: QUALCOMM Incorporated, San Diego, CA (US)

(72) Inventors: Parthasarathy Krishnamoorthy, San Diego, CA (US); Ruiming Zheng, Beijing (CN); Tao Luo, San Diego, CA (US); Chetan Chakravarthy, San Diego, CA (US); Vijay Marwah, San Diego, CA (US); Krishna Rao Mandadapu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 518 days.

(21) Appl. No.: 17/595,026

(22) PCT Filed: May 7, 2020

(86) PCT No.: PCT/CN2020/088914
§ 371 (c)(1),
(2) Date: Nov. 5, 2021

(87) PCT Pub. No.: WO2020/238572
PCT Pub. Date: Dec. 3, 2020

(65) Prior Publication Data
US 2022/0209916 A1    Jun. 30, 2022

(30) Foreign Application Priority Data

May 31, 2019    (WO) ............... PCT/CN2019/089511

(51) Int. Cl.
*H04L 5/00*    (2006.01)
(52) U.S. Cl.
CPC .......... *H04L 5/0051* (2013.01); *H04L 5/0053* (2013.01)

(58) Field of Classification Search
CPC .. H04L 5/0051; H04L 5/0053; H04W 74/002; H04W 74/004
See application file for complete search history.

(56) References Cited

U.S. PATENT DOCUMENTS

2013/0165134 A1* 6/2013 Touag ................... H04W 16/14
455/452.1
2013/0215866 A1* 8/2013 Ahn ..................... H04W 52/365
370/329
(Continued)

FOREIGN PATENT DOCUMENTS

| CN | 104394595 A | 3/2015 |
| CN | 105991215 A | 10/2016 |

(Continued)

OTHER PUBLICATIONS

Huawei, et al., "Overview of Bandwidth Part, CA, and DC Operation Including SRS Switching", 3GPP TSG RAN WG1 Meeting NR#3, R1-1715425, Nagoya, Japan, Sep. 18, 2017-Sep. 21, 2017, Sep. 21, 2017 (Sep. 21, 2017), 14 Pages, Section 7.2.
(Continued)

*Primary Examiner* — Jeong S Park
(74) *Attorney, Agent, or Firm* — Procopio, Cory, Hargreaves & Savitch LLP

(57) ABSTRACT

Currently, the MIMO MAC-CEs have been designed to support only one component carrier. Aspects described herein provide MAC-CEs and RRC signaling, which may facilitate efficient spatial and beam change indications for multiple component carriers. A UE may be configured to receive a configuration for each of a plurality of carriers. The UE may be configured to receive control information in a MAC-CE. The control information may comprise at least one of a TCI state, an CSI-RS resource configuration, or an SRS resource configuration. The UE may be further configured to determine whether the control information applies (Continued)

to multiple carriers from among the plurality of carriers. The UE may be configured to apply the control information to at least one of the plurality of carriers based on a determination of whether the control information applies to multiple carriers from among the plurality of carriers.

35 Claims, 11 Drawing Sheets

(56) References Cited

U.S. PATENT DOCUMENTS

| | | | |
|---|---|---|---|
| 2015/0049621 A1* | 2/2015 | Liu | H04L 5/0057 370/252 |
| 2016/0227523 A1 | 8/2016 | Desai et al. | |
| 2016/0302177 A1* | 10/2016 | Kwon | H04W 16/32 |
| 2017/0264401 A1 | 9/2017 | Soong et al. | |
| 2017/0359114 A1 | 12/2017 | Akkarakaran et al. | |
| 2018/0279168 A1 | 9/2018 | Jheng et al. | |
| 2018/0288755 A1 | 10/2018 | Liu et al. | |
| 2019/0274098 A1* | 9/2019 | Cheng | H04L 5/0025 |
| 2019/0357262 A1* | 11/2019 | Cirik | H04W 24/08 |
| 2020/0163061 A1* | 5/2020 | Tang | H04L 1/1812 |
| 2022/0039129 A1* | 2/2022 | Takeda | H04W 72/0446 |
| 2022/0103288 A1* | 3/2022 | Matsumura | H04L 5/0035 |
| 2022/0159640 A1* | 5/2022 | Matsumura | H04L 5/0023 |
| 2022/0201504 A1* | 6/2022 | Fujimura | H04W 16/28 |
| 2022/0225120 A1* | 7/2022 | Matsumura | H04W 72/046 |

FOREIGN PATENT DOCUMENTS

| | | |
|---|---|---|
| CN | 107431603 A | 12/2017 |
| CN | 108199999 A | 6/2018 |
| CN | 109788558 A | 5/2019 |
| WO | 2018171927 A1 | 9/2018 |
| WO | 2019028890 A1 | 2/2019 |
| WO | 2020227010 A1 | 11/2020 |

OTHER PUBLICATIONS

Interdigital, et al., "Remaining Issues on Beam Management", 3GPP Draft, 3GPP TSG RAN WG1 Meeting #92, R1-1802620 Beam Management Final, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398058, 6 Pages, Retrieved from the Internet: URL: http://www.3gpp.org/ftp/tsg%5Fran/WG1%5FRL1/TSGR1%5F92/Docs/ [retrieved on Feb. 17, 2018] the whole document.
International Search Report and Written Opinion—PCT/CN2019/089511—ISA/EPO—Mar. 4, 2020.
International Search Report and Written Opinion—PCT/CN2020/088914—ISA/EPO—Jul. 29, 2020.
MCC Support: "Draft Report of 3GPP TSG RAN WG1 #87 v0.2.0", 3GPP TSG RAN WG1 Meeting #88, R1-17xxxxx, 3rd Generation Partnership Project, Mobile Competence Centre, 650, Route Des Lucioles, F-06921 Sophia-Antipolis Cedex, France, vol. RAN WG1, No. Athens, Greece, Feb. 13, 2017-Feb. 17, 2017, Jan. 13, 2017, pp. 1-157, XP051202224, R1-1613119 Way Forward on SRS carrier based switching, p. 45.
MCC Support: "Draft Report of 3GPP TSG RAN WG1 #92bis v0.2.0 (Sanya, China, Apr. 16-20, 2018)", 3GPP TSG RAN WG1 Meeting #93, R1-180xxxx, Mobile Competence Centre, 650, Route Des Lucioles, F-06921 Sophia-Antipolis Cedex, France, vol. RAN WG1, No. Busan, May 21, 2018-May 25, 2018, May 9, 2018, pp. 1-192, XP051461540, Sect. 5.2.1.
Supplementary European Search Report—EP20813743—Search Authority—Sep. 7, 2023.
Supplementary Partial European Search Report—EP20813743—Search Authority—The Hague—Jun. 5, 2023.
Huawei, et al., "Overview of Bandwidth Part, CA, and DC Operation Including SRS Switching", 3GPP TSG RAN WG1 Meeting NR#3, R1-1715425, Nagoya, Japan, Sep. 18-21, 2017, 14 Pages, sections 1-9.

\* cited by examiner

| Single Carrier MIMO MAC CE Payload Size | | Newly Proposed MC MIMO MAC CE Payload Size | | % Reduction in Overhead |
| --- | --- | --- | --- | --- |
| Serving Cell ID (Range 0 to 31) | 5 bits | Serving Cell ID Bit Index (Range 0 to 31) | 32 bits | |
| BWP (Range 0 to 3) | 2 bits | BWP Bit Index (Range 0 to 3) | 4 bits | |
| TCI state ID (Range 0 to 127) | 128 bits | TCI state ID (Range 0 to 127) | 128 bits | |
| Reserved | 1 bit | Reserved | 4 bit | |
| Total Bits | 136 bits (17 octets) | Total Bits | 168 bits (21 octets) | |
| 1 CC PDSCH TCI State Activation/Deactivation | 136 bits (17 octets) | 1 CC PDSCH TCI State Activation/Deactivation | 168 bits (21 octets) | |
| 4 CC PDSCH TCI State Activation/Deactivation | 17*4 =68 Octets Required | 4 CC PDSCH TCI State Activation/Deactivation | 168 bits (21 octets) | 69.1% |
| 8 CC PDSCH TCI State Activation/Deactivation | 17*8 =136 Octets Required | 8 CC PDSCH TCI State Activation/Deactivation | 168 bits (21 octets) | 84.6% |

FIG. 4

ENHANCED MAC-CE AND RRC IE FOR MULTI-CARRIER CONFIGURATIONS

CROSS REFERENCE TO RELATED APPLICATION(S)

This application is a National Stage Application filed under 35 U.S.C. § 371 of PCT International Patent Application Serial No. PCT/CN2020/088914, entitled "ENHANCED MAC-CE AND RRC IE FOR MULTI-CARRIER CONFIGURATIONS" and filed on May 7, 2020, which claims priority to International Patent Application Serial No. PCT/CN2019/089511, entitled "ENHANCED MAC-CE AND RRC IE FOR MULTI-CARRIER CONFIGURATIONS" and filed on May 31, 2019, which is expressly incorporated by reference herein in its entirety.

BACKGROUND

Technical Field

The present disclosure relates generally to communication systems, and more particularly, to multi-carrier (MC) configurations.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Multiple input multiple output (MIMO) medium access control (MAC) control elements (CEs), e.g., in 5G NR, may support only one component carrier (e.g., only one serving cell identification (ID)). Such MIMO MAC-CEs that support a single component carrier may include a beam switch state, a transmission configuration indication (TCI) state, etc. Thus, a network may send individual MAC-CE's for each component carrier, which increases overhead and reduces throughput. The problem may be further aggravated with frequent beam switches, e.g., in field mobility scenarios. In certain aspects, such as beam management, a user equipment (UE) receive all component carriers in a shared spatial direction. Due to the complexity involved with beam management and UE antenna structure etc., deployments may use a shared spatial direction approach. Aspects described herein provide MAC-CEs and radio resource control (RRC) signaling that facilitate efficient spatial and beam change indications for multiple component carriers.

In an aspect of the disclosure, a method, a computer-readable medium, and an apparatus are provided. The apparatus may be a wireless device, for example, a UE. The apparatus may be configured to receive a configuration for each of a plurality of carriers. The apparatus may be configured to receive control information in a MAC-CE and to determine whether the control information applies to multiple carriers from among the plurality of carriers. The apparatus may be configured to apply the control information to at least one of the plurality of carriers based on a determination of whether the control information applies to multiple carriers from among the plurality of carriers. The control information may include, for example, at least one of a TCI state, a channel state information reference signal (CSI-RS) resource configuration, or a sounding reference signal (SRS) resource configuration.

In an aspect of the disclosure, a method, a computer-readable medium, and an apparatus are provided. The apparatus may be a wireless device, for example, a base station. The apparatus may be configured to configure a UE for a plurality of carriers. The apparatus may be configured to transmit control information to the UE in a MAC-CE and to provide an indication to the UE that the control information is applied to multiple carriers of the plurality of carriers. The control information may include, for example, at least one of a TCI state, a CSI-RS resource configuration, or a SRS resource configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4 is a diagram illustrating advantages of enhanced MAC-CE and RRC IE for multi-carrier configuration.

DETAILED DESCRIPTION

Figure 1:
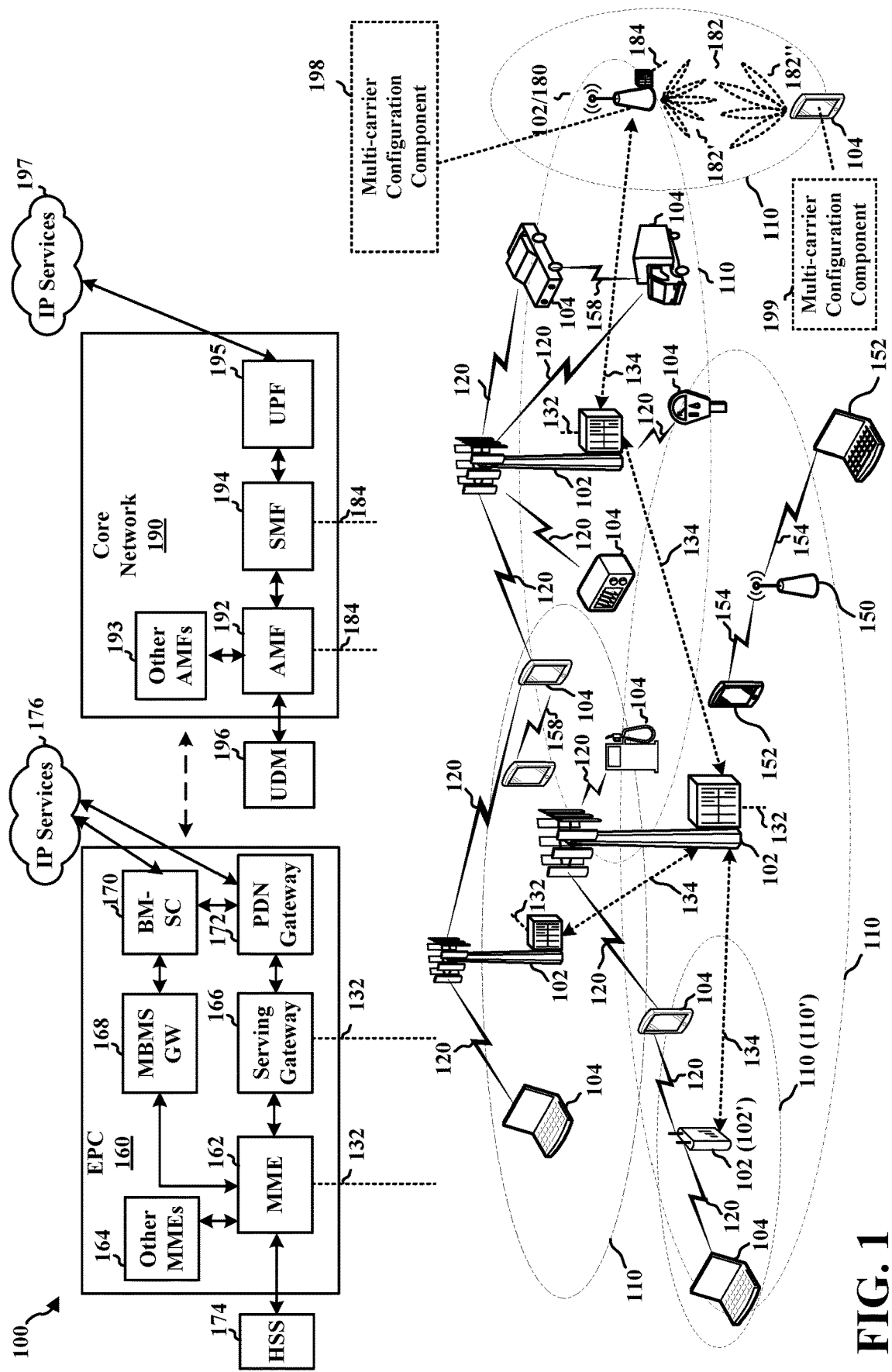
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 102/180 may comprise a multi-carrier configuration component 198 to configure the UE 104 for a plurality of carriers. The multi-carrier configuration component 198 may be configured to transmit control information to the UE in a MAC-CE and to provide an indication to the UE 104 that the control information is to be applied to multiple carriers of the plurality of carriers. The control information may comprise at least one of a TCI state, a CSI-RS resource configuration, or a SRS resource configuration or a PUCCH spatial relation indication. The UE 104 may comprise a multi-carrier configuration component 199 to receive a configuration for each of the plurality of carriers. The multi-carrier configuration component 199 may be configured to receive the control information in a MAC-CE and to determine whether the control information applies to the multiple carriers from among the plurality of carriers. The UE 104 may be configured to apply the control information to at least one of the plurality of carriers based on a determination of whether the control information applies to multiple carriers from among the plurality of carriers. Although the following description may be focused on 5G NR, the concepts described herein may be applicable to other similar areas, such as LTE, LTE-A, CDMA, GSM, and other wireless technologies.

Figure 2B:
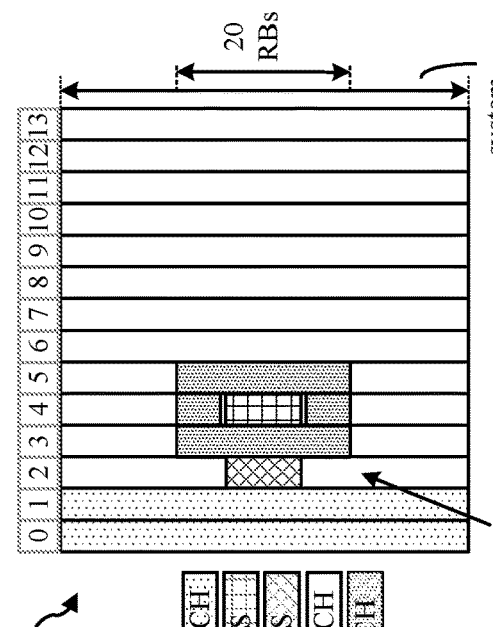
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2D:
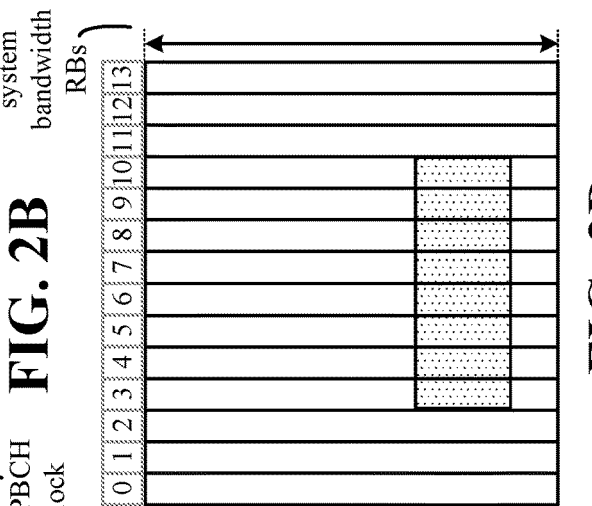
Figure 2A:
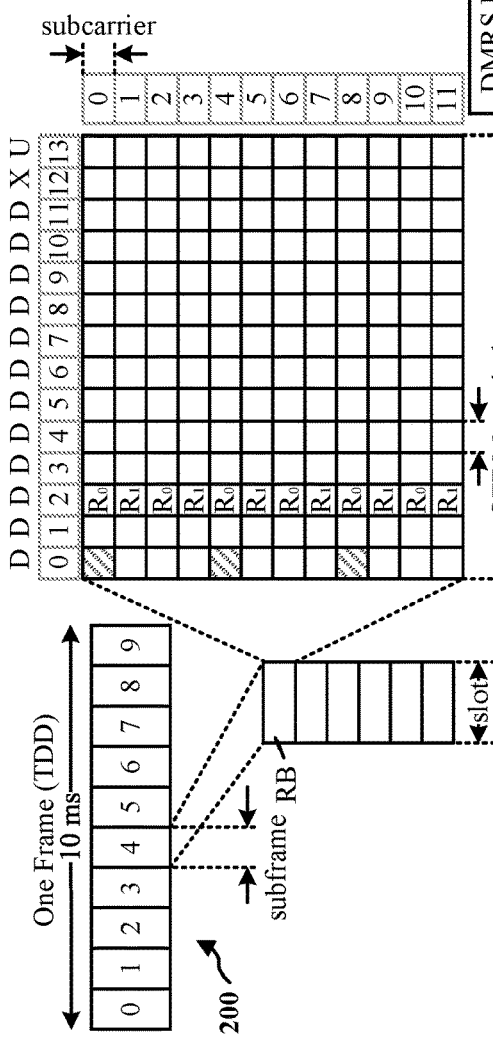
Figure 2C:
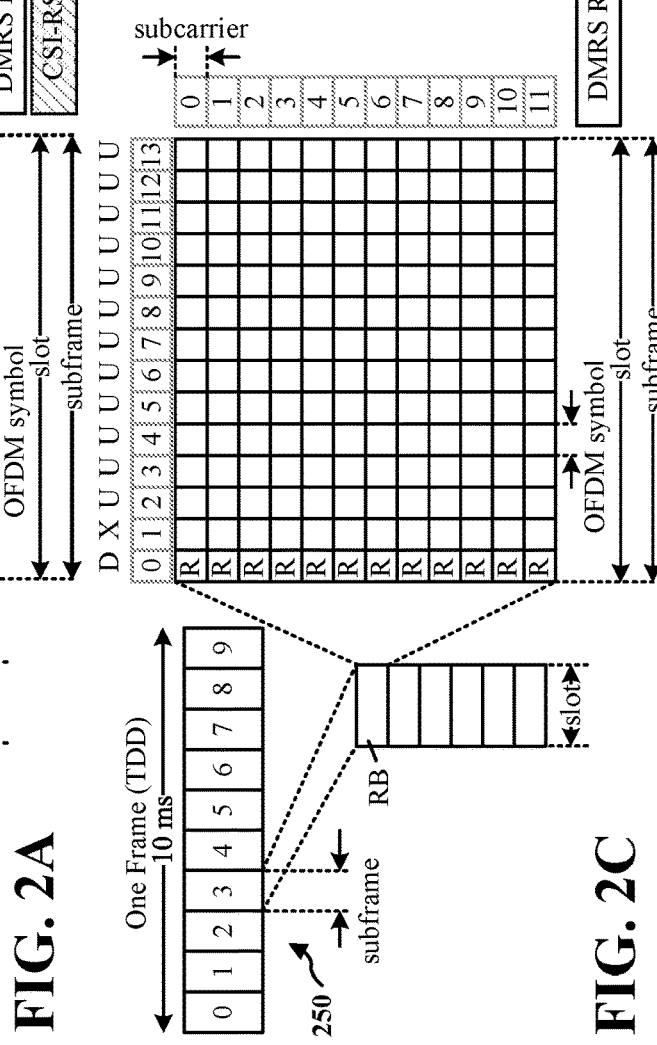

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu$=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
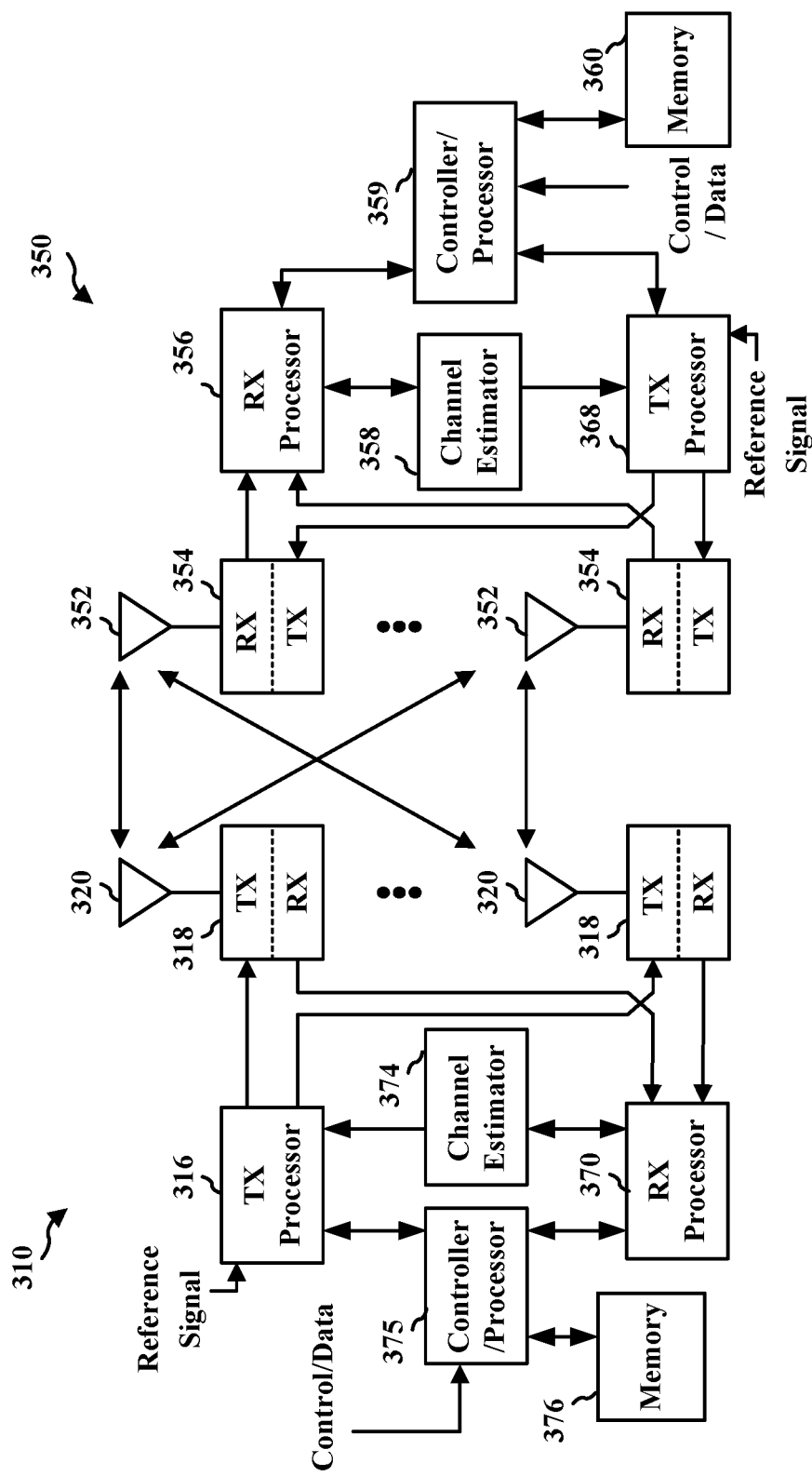
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. At least one of the TX processor 316, the RX processor 370, and the controller/processor 375 may be configured to perform aspects in connection with 198 of FIG. 1. At least one of the TX processor 368, the RX processor 356, and the controller/processor 359 may be configured to perform aspects in connection with 199 of FIG. 1.

MIMO MAC-CEs may support a single component carrier. For example, a TCI state activation/deactivation for a UE specific PDSCH MAC-CE may be identified by a MAC Protocol Data Unit (PDU) subheader, which supports one serving cell ID that corresponds to one component carrier. as another example, the MAC-CEs may include a beam switch state, a TCI state, etc. that applies to the component carrier. Thus, a network may send an individual MAC-CE for each of multiple component carriers. The network may send multiple MAC-CEs to address multiple, different carriers. The multiple MAC-CEs may have redundant information, which may result in high amounts of overhead and may negatively impact the network throughput. Beam switches may happen frequently, especially in mobility scenarios in which a UE moves from coverage of one beam to another beam. Frequent beam switches may compound the amounts of overhead and negative impact on throughput due to signaling control information for individual carriers in MAC-CEs.

From a beam management aspect, the UE may be expected to receive multiple component carriers in a shared spatial direction. Due to the complexity involved with beam management and UE antenna structure, deployments may use a shared spatial direction approach. As presented herein, a MAC-CE may be provided in common for multiple component carriers, e.g., in order to reduce duplicated information. Aspects presented herein provide new configurations to support multiple component carriers.

FIG. 4 is a diagram illustrating advantages of a proposed new MAC-CE for multi-carrier configuration. Aspects may also include a new RRC IE for multi-carrier configuration. The MAC-CE may facilitate efficient spatial and beam change indication for multiple component carriers, e.g., with a single MAC-CE. For example, the single MAC-CE may be applied to multiple, different component carriers. As illustrated in FIG. 4, the proposed multi-carrier MIMO MAC-CE may have a reduced payload size in comparison to sending multiple MAC-CEs, thereby resulting in a reduction in overhead. As shown in FIG. 4, the payload size of the single carrier MIMO MAC-CE may increase with the number of component carriers. The newly proposed MAC-CE may maintain a payload size of the same (21 octets) independent of the number of component carriers. The MAC-CE can be applied, e.g., to multiple component carriers possessing a same spatial relation or a same kind of CSI-RS resource configuration. For example, for a 4 component carrier TCI state, the payload size is about 68 octets for the single carrier approach, whereas the proposed multiple carrier approach has a payload size that is reduced to 21 octets. The reduction may correspond to a reduction of 69.2% in overhead. As another example, for an 8 component carrier TCI state, the payload size is about 136 octets for the single carrier approach, whereas the proposed multiple carrier approach reduces the payload size to 21 octets. The reduction may correspond to a reduction of 84.6% in overhead.

The MAC-CE may reference multiple component carriers and multiple bandwidth parts (BWPs) within the carrier e.g., using a carrier index and/or a BWP bitmap.

Figure 5:
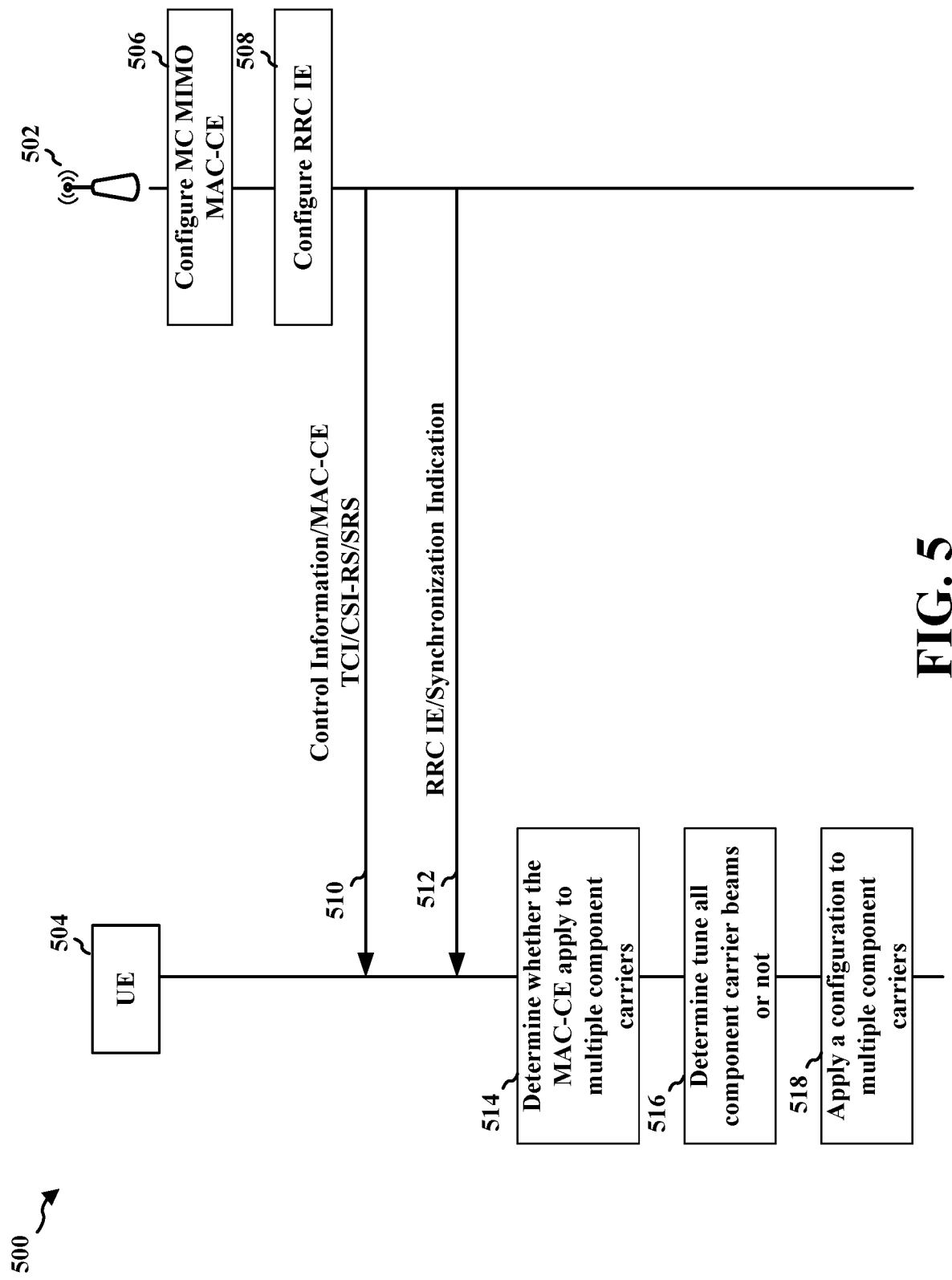
FIG. 5 is a diagram illustrating examples of enhanced MAC-CE and RRC IE for multi-carrier configuration.

FIG. 5 is a diagram illustrating examples of an enhanced MAC-CE for multiple carrier configuration. In some aspects, a base station 502 may configure a multi-carrier MIMO MAC-CE with different Logical Channel ID (LCID) values, as illustrated at 506. A carrier bit index for each of the multiple carriers and/or a BWP bitmap associated with the multiple carriers may be included in the MIMO MAC-CE. The base station 502 may send control information including the MIMO MAC-CE 510 to a UE 504. The UE 504 may determine whether the MIMO MAC-CE 510 applies to multiple carriers at 514. In this way, the base station 502 or a network may be able to address different component carriers with the same MAC-CE 510. For example, a shared MAC-CE may be transmitted for multiple component carriers that possess either a same spatial relation or a same kind of CSI-RS or SRS resource configuration or a PUCCH spatial relation indication.

For example, in the scenario of 8 component carriers, 4 component carriers may be coming in one spatial direction (from 1 sector of the base station 502), and the other 4 component carriers may come in other spatial direction (from adjacent sector of the base station 502). Thus, two MAC-CEs may be sufficient to indicate the spatial relation/beam indication for the 8 component carriers. As an example, in a first MAC-CE, for a carrier bit index of 32 bit, 0-3 bits (e.g., corresponding to a first carrier C0, a second carrier C1, a third carrier C2, and a fourth carrier C3) of least significant bits (LSBs) may be set to 1 and the remaining most significant bits (MSBs) may be set to 0. Thus, the UE 504 may understand that the first MAC-CE is applicable only to the carriers C0 to C3. As another example, in a second MAC-CE, for a carrier bit index of 32 bit, 4-7 bits (e.g., corresponding to a fifth carrier C4, a sixth carrier C5, a seventh carrier C6, and an eight carrier C7) of LSBs may be set to 1 and the remaining MSBs may be set to 0. Thus, a UE 504 may understand that the second MAC-CE is applicable only to the carriers C4 to C7.

For example, the new MIMO multi-carrier MAC-CE with different LCID values may be used in addition to the single component carrier MAC-CE. Thus, there may be the flexibility of using either single component carrier MAC-CE or the multi-carrier MAC-CE according to the active component carriers of the UE 504. Though the new MIMO multi-carrier MAC-CE may be used even for a single component carrier, the MIMO multi-carrier MAC-CE may not be efficient when compared with the single component carrier MAC-CE. When decoding the LCID of the MAC-CE, the UE 504 may determine whether the MAC-CE is a single component carrier MAC-CE or a MIMO multi-carrier MAC-CE. Accordingly, the UE 504 may apply the configuration for the indicated carriers.

In some aspects, the base station 502 may indicate to the UE whether a spatial synchronization exists for different component carriers at 508. The indication may be comprised, e.g., in an RRC IE. In one approach, the RRC IE 512 of may indicate whether spatial synchronization exists among the configured component carriers using a {Yes, No} indication. The indication may be referred to as a carrier spatial synchronization IE. The carrier spatial synchronization IE may be included with physical cell group configuration information (e.g., which may be referred to as 'PhysicalCellGroupConfig') in an RRC reconfiguration message. As an example, if Carrier Spatial Synchronization IE indicates "Yes," the UE may determine that spatial synchronization exists or should be applied for each of the UE's configured component carriers. Thus, whenever the UE 504 receives a MAC-CE or DCI for one of the component carriers, the UE 504 may tune all the beams of the configured component carriers to that TCI state, as illustrated at 516. Thus, a UE may receive a single carrier MAC-CE, and may apply a TCI state in the single carrier MAC-CE to each of the UE's configured component carriers. On the other hand, if Carrier Spatial Synchronization field indicates "No," the UE 504 may look for individual MAC-CEs or DCI for each of the component carriers. Thus, the UE may process the individual MAC-CE or DCI accordingly.

In another approach, the new RRC IE 512 may be provided that indicates a set of component carriers that share spatial synchronization. Thus, the base station may indicate multiple component carriers that share a spatial synchronization without indicating a spatial synchronization of all configured component carriers. The RRC IE may be applied as a "Need Maintain" category. For example, whenever such an RRC IE is absent, the UE 504 may maintain the last received RRC IE. The RRC IE may indicate indexes for a set of serving cells, e.g., that may range from Carrier Spatial Synchronization for (1 . . . maximum Number of Serving Cells)). For example, if the maximum number of serving cells is 32, the serving cell indexes may correspond to {0, 1, 2, 3, . . . , 31}.

As an example, Carrier Spatial Sync {0, 1, 4, 5} RRC IE may indicate that a set of serving cells with Serving Cell Index of 0, 1, 4, 5 possess a same kind of spatial relation. Thus, whenever a MIMO MAC-CE is received by the UE 504 with any one of the serving cells from the set of serving cells, the UE 504 may automatically leverage the MAC-CE for the other serving cells indicated in the set of serving cells, as illustrated at 518. For an indicated set of {0, 1, 4, 5}, if the UE 504 receives a MIMO MAC CE with serving cell index 1, the UE will apply the received configuration to other serving cells with index 0, 4, 5 from the set of serving cells. Thus, the UE will apply the configuration, e.g., TCI state, to the other serving cells of the indicated set without receiving additional carrier specific MAC-CE for the other serving cells.

The new RRC IE 512 may be similarly applied to CSI-RS resource configuration, SRS resource configuration, etc. For example, the RRC IE may indicate a set of component carriers that share a same kind of CSI-RS or SRS resource configuration. In one example, CSI-RS Configuration Synchronization may be indicated for a set of serving cells. The set of serving cells may include indices for any of (1, 2, 3, . . . , maximum number of serving cells). Similar to the example for spatial synchronization, a set of {0, 1, 4, 5} could be used to indicate a CSI-RS configuration synchronization for serving cells corresponding to indices 0, 1, 4, and 5. Thus, when the UE receives a CSI-RS configuration for a component carrier corresponding to a serving cell indicated in the set, the UE will also apply the CSI-RS configuration to the remaining serving cells indicated in the set. In another example, SRS Configuration Synchronization may be indicated for a set of serving cells. The set of serving cells may include indices for any of (1, 2, 3, . . . , maximum number of serving cells). Similar to the example for spatial synchronization, a set of {0, 1, 3, 8} could be used to indicate a SRS configuration synchronization for serving cells corresponding to indices 0, 1, 3, and 8. Thus, if the UE receives a CSI-RS configuration for a component carrier corresponding to serving cell index 3, the UE will also apply the CSI-RS configuration to the remaining serving cells indicated in the set (e.g., corresponding to serving cell indexes 0, 1, and 8). The RRC IE may help provide more efficient MIMO MAC-CE communication compared with the with a single carrier MIMO MAC-CE.

The proposed multi-carrier MIMO MAC-CE and RRC IE disclosed herein may substantially reduce the overhead, e.g., by 69% for 4 component carriers and 84.6% for 8 component carriers, when all component carriers possess the same spatial relation. The proposed multi-carrier MIMO MAC-CE and/or RRC IE may be used along with single carrier MAC-CEs. Thus, the proposed aspects may provide more flexibility to the network operators to choose octet efficient MAC-CEs, according to the deployment configuration. In this way, the DCI Payload may be significantly reduced for the secondary component carriers. As the spatial relation between the component carriers may be communicated via an RRC IE, a TCI indication in primary component carrier (PCC)-DCI may be leveraged to spatially synchronized component carriers (which have been indicated to the UE via RRC IE) without adding redundant TCI information in secondary component carrier (SCC)-DCIs. Similarly, a CSI-RS configuration relation or an SRS configuration relation may be indicated for different component carriers using RRC signaling, so that a received CSI-RS configuration or SRS configuration may be applied to each of the component carriers that are indicated as sharing the CSI-RS configuration relation or the SRS configuration relation.

Figure 6:
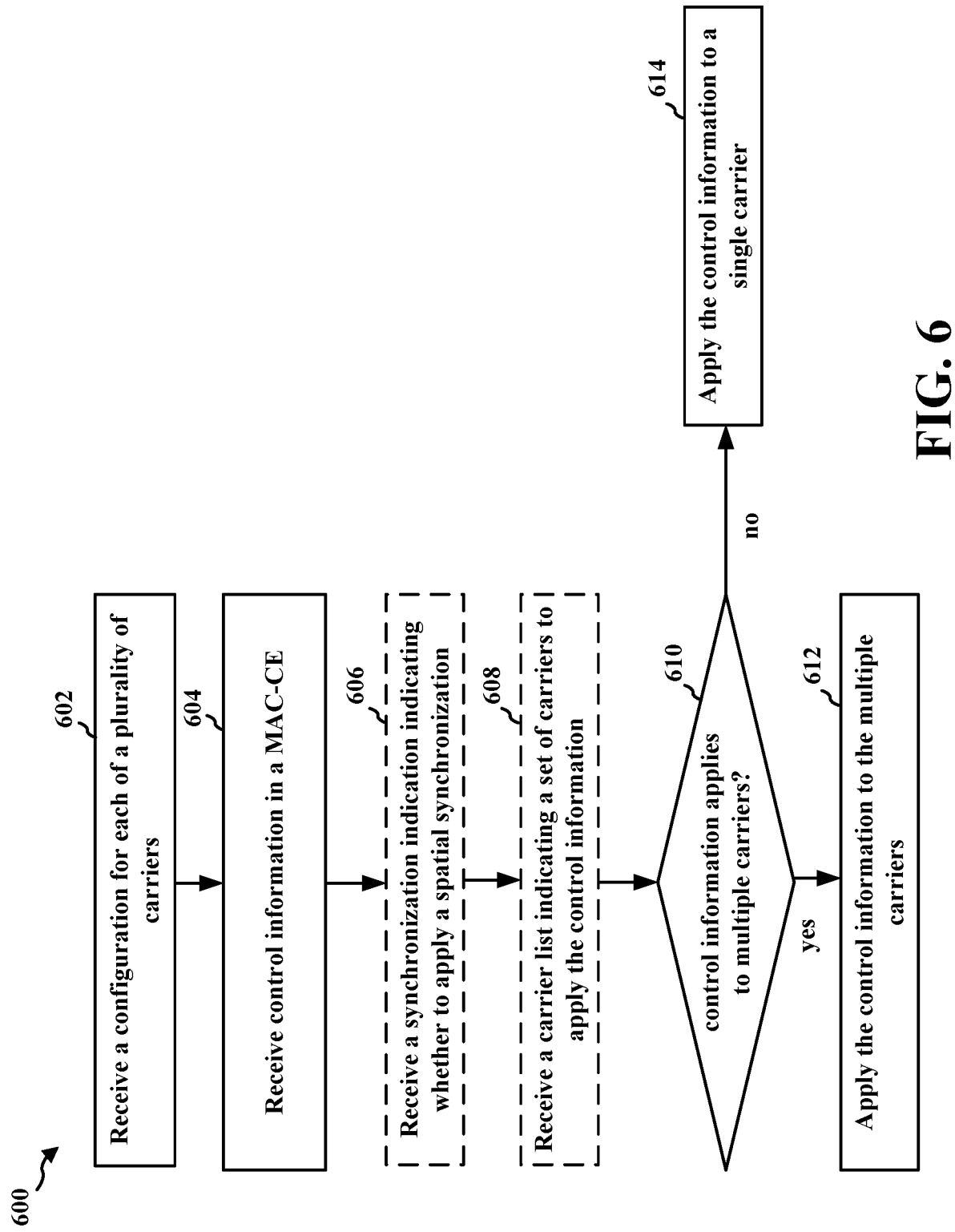
FIG. 6 is a flowchart of a method of wireless communication.

FIG. 6 is a flowchart 600 of a method of wireless communication. The method may be performed by a UE (e.g., the UE 104, 504, 1050; the apparatus 702/702'; the processing system 814, which may include the memory 360 and which may be the entire apparatus 702/702' or a component of the apparatus 702/702', such as the TX processor 368, the RX processor 356, and/or the controller/processor 359) communicating with a base station (e.g., the base station 102/180, 502, 750). The wireless communication may comprise 5G/NR, and/or LTE communication. To facilitate an understanding of the techniques and concepts described herein, the method of flowchart 600 may be discussed with reference to the examples illustrated in FIGS. 4-5. Optional aspects are illustrated in dashed lines. In the method, even with a single MAC-CE, the base station may be able to address different component carriers at a same instant, if all of the component carriers possess either a same spatial relation in downlink or uplink, or a same kind of CSI-RS or SRS resource configuration. The method may reduce overhead, when multiple component carriers possess a same spatial relation, a CSI-RS configuration relation and/or a SRS configuration relation. The proposed method may provide more flexibility to the network operators to choose octet efficient MAC-CEs or RRC IEs, according to the deployment configuration.

At 602, the UE may receive a configuration for each of a plurality of carriers. For example, 602 may be performed by a carrier configuration component 708, via a reception component 704 in apparatus 702 of FIG. 7.

At 604, the UE may receive control information in a MAC-CE. The control information may comprise, for example, at least one of a TCI state, a CSI-RS resource configuration, or an SRS resource configuration or a PUCCH spatial relation indication. For example, 604 may be performed by a control information component 710, via a reception component 704 of apparatus 702.

In some aspects, the control information may comprise a carrier indicator that indicates multiple carriers from among the plurality of carriers. For example, the carrier indicator may comprise a carrier bit index. For example, the multiple carriers may be indicated using least significant bits of the carrier bit index. For example, referring back to FIG. 5, the base station 502 may send control information including the MIMO MAC-CE 510 to a UE 504. The UE 504 may determine whether the MIMO MAC-CE 510 applies to multiple carriers at 514. In this way, even with the single MAC-CE 510, the base station 502 or a network may be able to address different component carriers at a same instant, if all of the component carriers possess either a same spatial relation or a same kind of CSI-RS resource configuration. For example, in the scenario of 8 component carriers, 4 component carriers may be coming in one spatial direction (from 1 sector of the base station 502), and the other 4 component carriers may be coming in other spatial direction (from adjacent sector of the base station 502). Thus, two MAC-CEs may be sufficient to indicate the spatial relation/beam indication for the component carriers.

In another example, in a first MAC-CE, for a carrier bit index of 32 bit, 0-3 bits (e.g., corresponding to a first carrier C0, a second carrier C1, a third carrier C2, and a fourth carrier C3) of least significant bits (LSBs) may be set to 1 and the remaining most significant bits (MSBs) may be set to 0. Thus, the UE may understand that the first MAC-CE is applicable only to the carriers C0 to C3. As another example, in a second MAC-CE, for a carrier bit index of 32 bit, 4-7 bits (e.g., corresponding to a fifth carrier C4, a sixth carrier C5, a seventh carrier C6, and an eighth carrier C7) of LSBs may be set to 1 and the remaining MSBs may be set to 0. Thus, a UE may understand that the second MAC-CE is applicable only to the carriers C4 to C7.

For example, the new MIMO MC MAC-CE with different LCID values may be used in addition to the single component carrier MAC-CE. Thus, there may be the flexibility of using either single component carrier MAC-CE or the MC MAC-CE according to the active component carriers of the UE. Though the new MIMO MC MAC-CE may be used even for a single component carrier, it may not be octet efficient when compared with the single component carrier MAC-CE. When decoding of the LCID of the MAC-CE, the UE may determine, e.g., at 610, whether the MAC-CE is a single component carrier MAC-CE or a MIMO MC MAC-CE. Accordingly, the UE may proceed with the intended configuration for the specific carriers.

At 606, the UE may receive a synchronization indication from a base station indicating whether to apply a spatial synchronization to the plurality of carriers. For example, 606 may be performed by an indication component 712, via a reception component 704 of apparatus 702. For example, referring back to FIG. 5, the base station 502 may configure a new RRC IE 512 indicating synchronization of a spatial direction for different component carriers at 508. In one approach, the RRC IE 512 of Carrier Spatial Synchronization may indicate {Yes, No}. The RRC IE may be included under a Physical Cell Group Configuration in the RRC reconfiguration message. As an example, if Carrier Spatial Synchronization IE indicates Yes, when the UE 504 receives a MAC-CE or DCI for any one of the component carriers, the UE 504 may apply the MAC-CE or DCI to all of the configured component carriers. Thus, the UE may tune all the carrier beams to a received TCI state, as illustrated at 516. On the other hand, if Carrier Spatial Synchronization IE indicates No, the UE 504 may look for an individual MAC-CE or DCI for each component carrier, e.g., at 614.

At 608, the UE may receive an indication carrier list from a base station indicating a set of carriers from among the plurality of carriers to apply the control information in the MAC-CE. For example, 608 may be performed by an indication component 712, via a reception component 704, from FIG. 7. As an example, Carrier Spatial Synchronization RRC IE may indicate a set of {0, 1, 4, 5} that correspond to a set of serving cells with Serving Cell Index of 0, 1, 4, 5 that possess a same kind of spatial relation, CSI-RS relation, or SRS relation or PUCCH spatial relation indication. Hence when a MIMO MAC-CE is received by the UE for any one of the serving cells from the set of serving cells, the UE may automatically leverage the MAC-CE to other serving cells of the set of serving cells, as illustrated at 612. If the UE receives a MIMO MAC CE with serving cell index 1, that configuration may be automatically applied to other serving cells with index 0, 4, 5 from the set of serving cells without receiving additional carrier specific MAC-CE for these serving cells.

At 610, the UE may determine whether the control information applies to multiple carriers from among the plurality of carriers. For example, 610 may be performed by a determination component 714 of apparats 702. For example, the UE may determine carriers to which the control information applies using LSBs of a carrier bit index. As another example, the UE may determine whether to apply the control information to multiple carriers from among the plurality of carriers based on the synchronization indication received at 606 and/or 608. For example, referring back to FIG. 5, if Carrier Spatial Synchronization IE indicates Yes, the UE may apply the control information to all configured component carriers, at 612. On the other hand, if Carrier Spatial Synchronization IE indicates No, the UE 504 may look for individual MAC-CE or DCI and process the individual MAC-CE or DCI accordingly, e.g., at 614. For example, the UE may determine whether to apply the control information to the set of carriers from among the plurality of carriers based on the synchronization indication, received at 608. For example, referring back to FIG. 5, whenever any MIMO MAC-CE is received by the UE with any one of the serving cells from the set of serving cells, the UE may automatically leverage the MAC-CE to other serving cells of the set of serving cells, as illustrated at 612.

At 612, the UE may apply the control information to at least one of the plurality of carriers based on a determination of whether the control information applies to multiple carriers from among the plurality of carriers. For example, 612 may be performed by an application component 716, from FIG. 7. For example, the UE may apply the control information to the multiple carriers indicated by the carrier indicator. If the UE determines that the control information does not apply to multiple carriers, the UE may apply the control information to a single carrier, at 614.

For example, the control information may comprise a TCI state, and the UE may apply the TCI state to multiple carriers from among the plurality of carriers. As another example, the control information may comprise an SRS resource configuration, and the UE may apply the SRS resource configuration to multiple carriers from among the plurality of carriers. As another example, the control information may comprise a CSI-RS configuration, and the UE may apply the CSI-RS configuration to multiple carriers from among the plurality of carriers.

Figure 7:
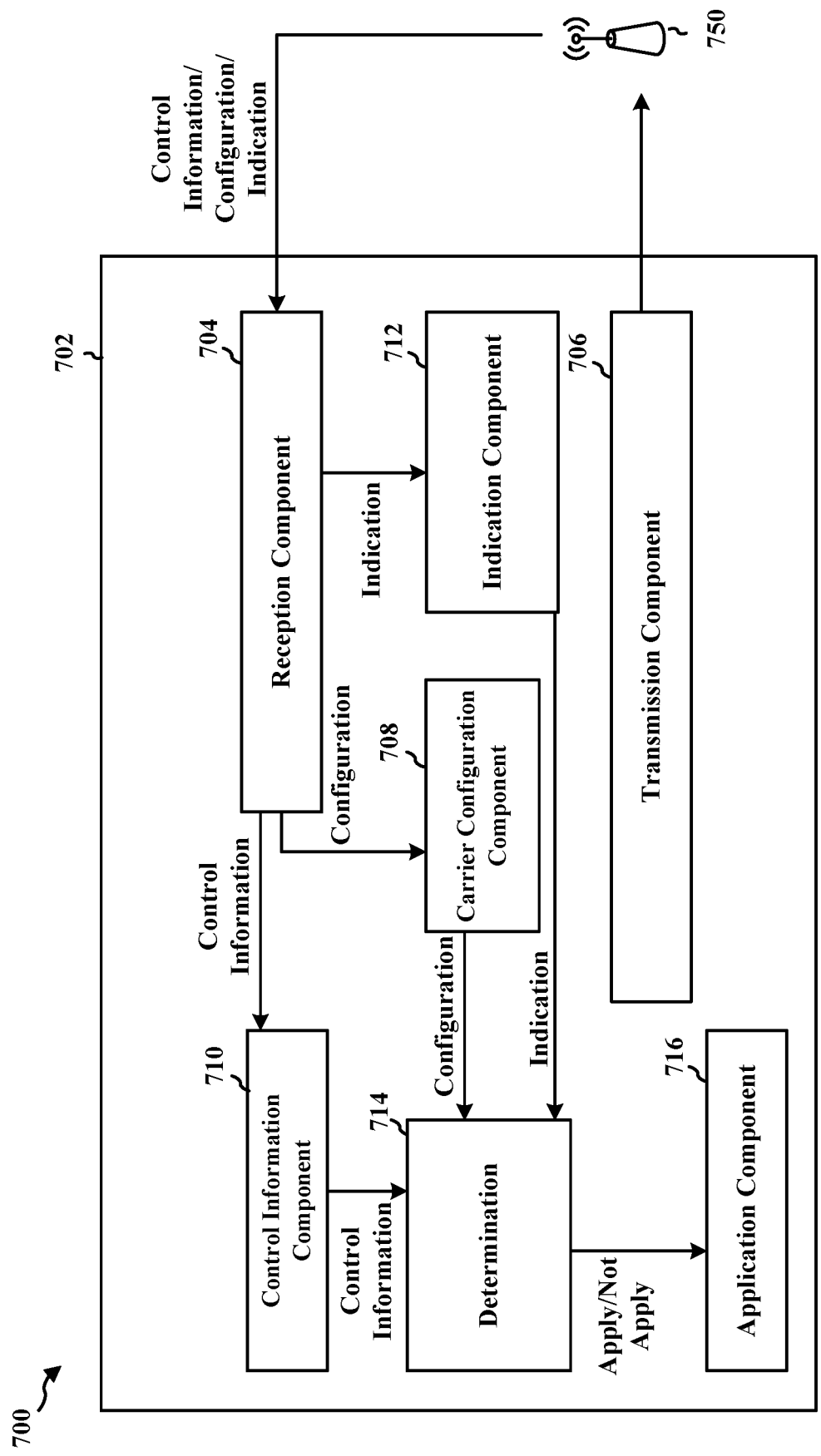
FIG. 7 is a conceptual data flow diagram illustrating the data flow between different means/components in an example apparatus.

FIG. 7 is a conceptual data flow diagram 700 illustrating the data flow between different means/components in an example apparatus 702. The apparatus may be a UE or a component of a UE (e.g., the UE 104, 504, 1050; the apparatus 702/702'; the processing system 814, which may include the memory 360 and which may be the entire apparatus 702/702' or a component of the apparatus 702/702', such as the TX processor 368, the RX processor 356, and/or the controller/processor 359). The apparatus includes a carrier configuration component 708 that is configured to receive a configuration for each of a plurality of carriers, via a reception component 704, e.g., as described in connection with 602 in FIG. 6. The apparatus includes a control information component 710 that is configured to receive control information in a MAC-CE, via a reception component 704, e.g., as described in connection with 604 in FIG. 6. The control information may include, for example, at least one of a TCI state, a CSI-RS resource configuration, or a SRS resource configuration or a PUCCH spatial relation indication. The apparatus includes an indication component 712 that is configured to receive, via a reception component 704, a synchronization indication from a base station indicating whether to apply a spatial synchronization to the plurality of carriers, e.g., as described in connection with 606 in FIG. 6, or a synchronization indication from a base station indicating a set of carriers from among the plurality of carriers to apply a spatial synchronization e.g., as described in connection with 608 in FIG. 6. The synchronization component may receive a carrier list that indicates a set of carriers for the UE to apply the control information in the MAC-CE. The apparatus includes a determination component 714 that is configured to determine whether the control information applies to multiple carriers from among the plurality of carriers, e.g., as described in connection with 610 in FIG. 6. The apparatus includes an application component 716 that is configured to apply the control information to at least one of the plurality of carriers based on a determination of whether the control information applies to multiple carriers from among the plurality of carriers, e.g., as described in connection with 612 in FIG. 6. The apparatus further includes a transmission component 706.

The apparatus may include additional components that perform each of the blocks of the algorithm in the aforementioned flowcharts of FIGS. 5-6. As such, each block in the aforementioned flowcharts of FIGS. 5-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
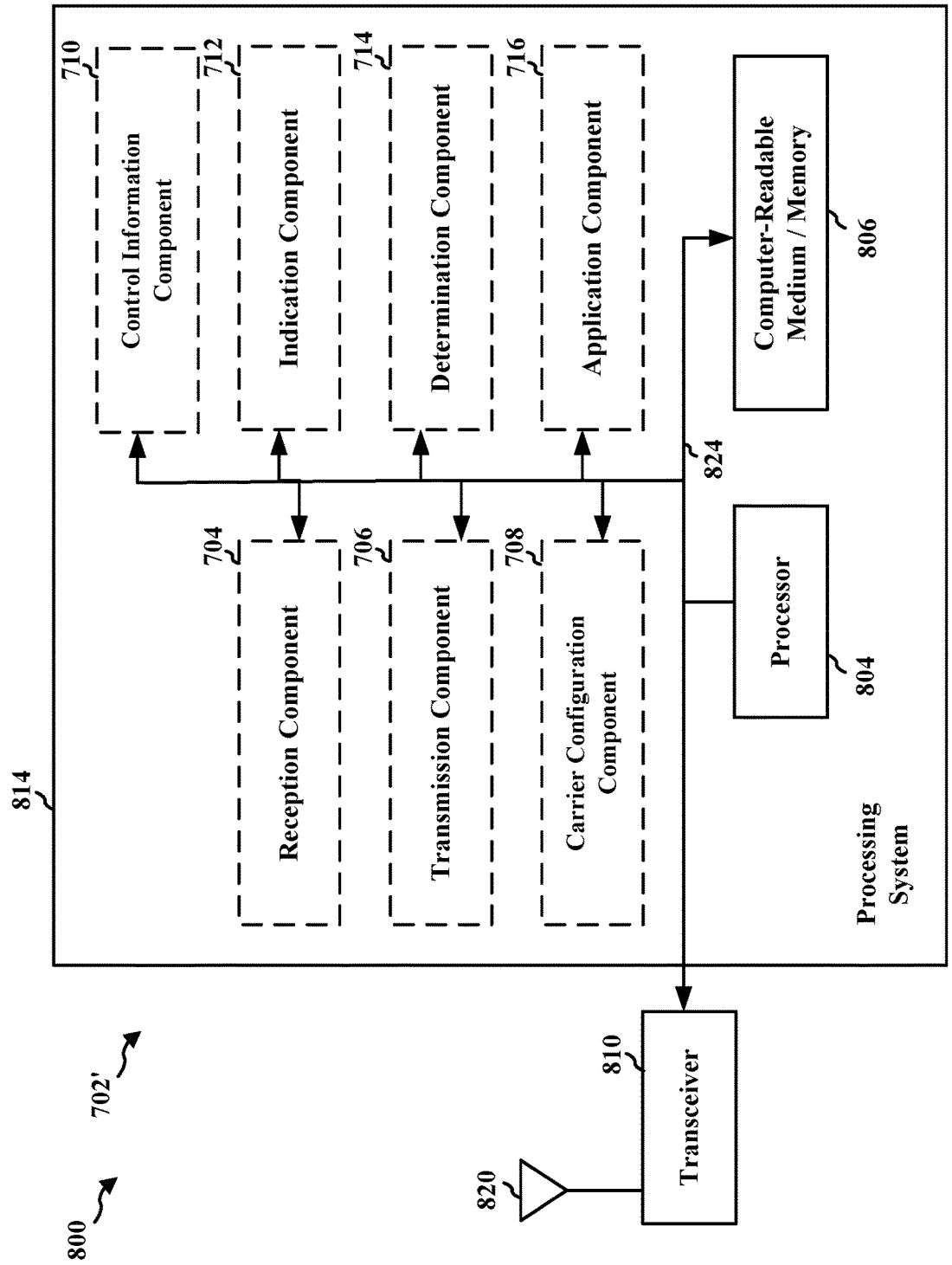
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for receiving a configuration for each of a plurality of carriers. The apparatus may include means for receiving control information comprising at least one of a TCI state, an CSI-RS resource configuration, or an SRS resource configuration or a PUCCH spatial relation indication. The apparatus may include means for determining whether the control information applies to multiple carriers from among the plurality of carriers. The apparatus may include means for applying the control information to at least one of the plurality of carriers based on a determination of whether the control information applies to multiple carriers from among the plurality of carriers. In one configuration, the apparatus 702/702' may include means for receiving a synchronization indication from a base station indicating whether to apply a spatial synchronization to the plurality of carriers, wherein the UE determines whether to apply the control information to multiple carriers from among the plurality of carriers based on the synchronization indication. In one configuration, the apparatus 702/702' may include means for receiving a synchronization indication from a base station indicating a set of carriers from among the plurality of carriers to apply a spatial synchronization, wherein the UE determines whether to apply the control information to the set of carriers from among the plurality of carriers based on the synchronization indication.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
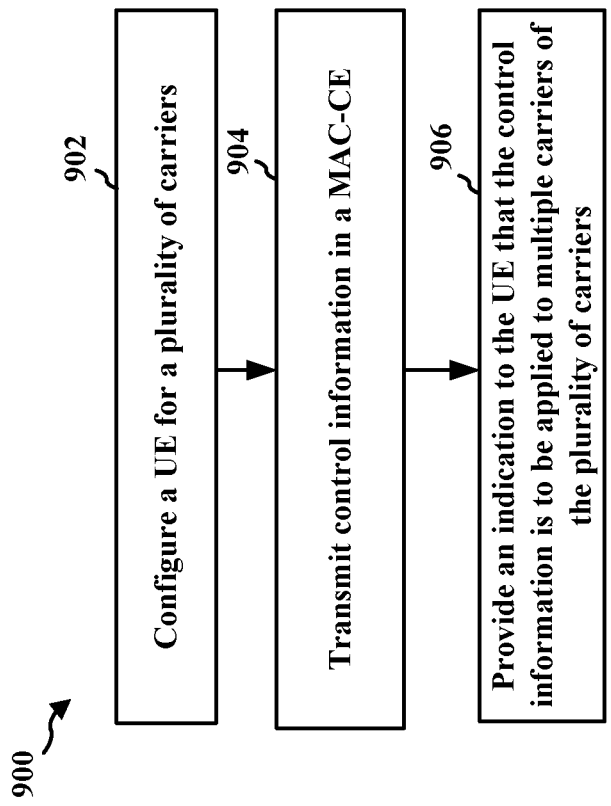
FIG. 9 is a flowchart of a method of wireless communication.

FIG. 9 is a flowchart 900 of a method of wireless communication. The method may be performed by a base station (e.g., the base station 102/180, 502, 750; the apparatus 1002/1002'; the processing system 1114, which may include the memory 376 and which may be the entire apparatus 1002/1002' or a component of the apparatus 1002/1002', such as the TX processor 316, the RX processor 370, and/or the controller/processor 375) communicating with a UE (e.g., the UE 104, 504, 1050). The wireless communication may comprise 5G/NR, and/or LTE communication. To facilitate an understanding of the techniques and concepts described herein, the method of flowchart 900 may be discussed with reference to the examples illustrated in FIGS. 4-5. Optional aspects may be illustrated in dashed lines. Aspects of the method may enable a base station to address different component carriers using a single MAC-CE, if all of the component carriers possess either a same spatial relation, a CSI-RS resource configuration relation, or a SRS configuration relation or PUCCH spatial relation indication. The method may reduce the overhead, when multiple component carriers possess the same spatial relation, CSI-RS resource configuration relation, or a SRS configuration relation or a PUCCH spatial relation indication. The proposed method may provide more flexibility to the network operators to choose octet efficient MAC-CEs or RRC IEs, according to the deployment configuration.

At 902, the base station may configure a UE for a plurality of carriers. For example, 902 may be performed by a carrier configuration component 1008, via a transmission component 1006, from FIG. 10

At 904, the base station may transmit control information in a MAC-CE. The control information may comprise at least one of a TCI state, an CSI-RS resource configuration, or an SRS resource configuration or a PUCCH spatial relation indication to the UE. For example, 904 may be performed by a control information component 1010, via a transmission component 1006, from FIG. 10.

In some aspects, the control information may comprise a carrier indicator that indicates multiple carriers from among the plurality of carriers. For example, the carrier indicator may comprise a carrier bit index. For example, the multiple carriers may be indicated using least significant bits of the carrier bit index. For example, referring back to FIG. 5, the base station 502 may send control information including the MIMO MAC-CE 510 to a UE 504. The UE 504 may determine whether the MIMO MAC-CE 510 applies to multiple carriers at 514. In this way, even with the single MAC-CE 510, the base station 502 or a network may be able to address different component carriers at a same instant, if all of the component carriers possess either a same spatial relation or a same kind of CSI-RS resource configuration. For example, in the scenario of 8 component carriers, 4 component carriers may be coming in one spatial direction (from 1 sector of the base station 502), and the other 4 component carriers may be coming in other spatial direction (from adjacent sector of the base station 502). Thus, two MAC-CEs may be sufficient to indicate the spatial relation/beam indication for the component carriers.

In another example, in a first MAC-CE, for a carrier bit index of 32 bit, 0-3 bits (e.g., corresponding to a first carrier C0, a second carrier C1, a third carrier C2, and a fourth carrier C3) of least significant bits (LSBs) may be set to 1 and the remaining most significant bits (MSBs) may be set to 0. Thus, the UE may understand that the first MAC-CE is applicable only to the carriers C0 to C3. As another example, in a second MAC-CE, for a carrier bit index of 32 bit, 4-7 bits (e.g., corresponding to a fifth carrier C4, a sixth carrier C5, a seventh carrier C6, and an eighth carrier C7) of LSBs may be set to 1 and the remaining MSBs may be set to 0. Thus, a UE may understand that the second MAC-CE is applicable only to the carriers C4 to C7.

For example, the new MIMO MC MAC-CE with different LCID values may be used in addition to the single component carrier MAC-CE. Thus, there may be the flexibility of using either single component carrier MAC-CE or the MC MAC-CE according to the active component carriers of the UE. Though the new MIMO MC MAC-CE may be used even for a single component carrier, it may not be octet efficient when compared with the single component carrier MAC-CE. When decoding of the LCID of the MAC-CE, the UE may determine, e.g., at 610, whether the MAC-CE is a single component carrier MAC-CE or a MIMO MC MAC-CE. Accordingly, the UE may proceed with the intended configuration for the specific carriers.

At 906, the base station may provide an indication to the UE that the control information is to be applied to multiple carriers of the plurality of carriers. For example, 904 may be performed by an indication component 1012 from FIG. 10. In some examples, the base station may provide a carrier list that indicates the set of carriers from a plurality of carriers for the UE to apply the control information in the MAC-CE.

In some aspects, the indication may comprise a carrier indicator comprised in the MAC-CE that indicates the multiple carriers from among the plurality of carriers. For example, the carrier indicator may comprise a carrier bit index.

In some aspects, the indication may comprise a synchronization indication indicating whether to apply a spatial synchronization to each of the plurality of carriers. For example, referring back to FIG. 5, the base station 502 may configure a new RRC IE 512 indicating synchronization of a spatial direction for different component carriers at 508. In one approach, the RRC IE 512 of Carrier Spatial Synchronization may indicate {Yes, No}. The RRC IE may be included under a Physical Cell Group Configuration in the RRC reconfiguration message. As an example, if Carrier Spatial Synchronization IE indicates Yes, when the UE 504 receives a MAC-CE or DCI for any one of the component carriers, the UE 504 may apply the MAC-CE or DCI to all of the configured component carriers. Thus, the UE may tune all the carrier beams to a received TCI state, as illustrated at 516. On the other hand, if Carrier Spatial Synchronization IE indicates No, the UE 504 may look for an individual MAC-CE or DCI for each component carrier, e.g., at 614.

In some aspects, the indication may comprise a synchronization indication indicating a set of carriers from among the plurality of carriers to apply a spatial synchronization. As an example, Carrier Spatial Synchronization RRC IE may indicate a set of {0, 1, 4, 5} that correspond to a set of serving cells with Serving Cell Index of 0, 1, 4, 5 that possess a same kind of spatial relation, CSI-RS relation, or SRS relation or a PUCCH spatial relation indication. Hence when a MIMO MAC-CE is received by the UE for any one of the serving cells from the set of serving cells, the UE may automatically leverage the MAC-CE to other serving cells of the set of serving cells, as illustrated at 612. If the UE receives a MIMO MAC CE with serving cell index 1, that configuration may be automatically applied to other serving cells with index 0, 4, 5 from the set of serving cells without receiving additional carrier specific MAC-CE for these serving cells.

For example, the UE may apply the control information to the multiple carriers indicated by the carrier indicator. If the UE determines that the control information does not apply to multiple carriers, the UE may apply the control information to a single carrier, at 614. For example, the control information may comprise a TCI state, and the UE may apply the TCI state to multiple carriers from among the plurality of carriers. As another example, the control information may comprise an SRS resource configuration, and the UE may apply the SRS resource configuration to multiple carriers from among the plurality of carriers. As another example, the control information may comprise a CSI-RS configuration, and the UE may apply the CSI-RS configuration to multiple carriers from among the plurality of carriers.

Figure 10:
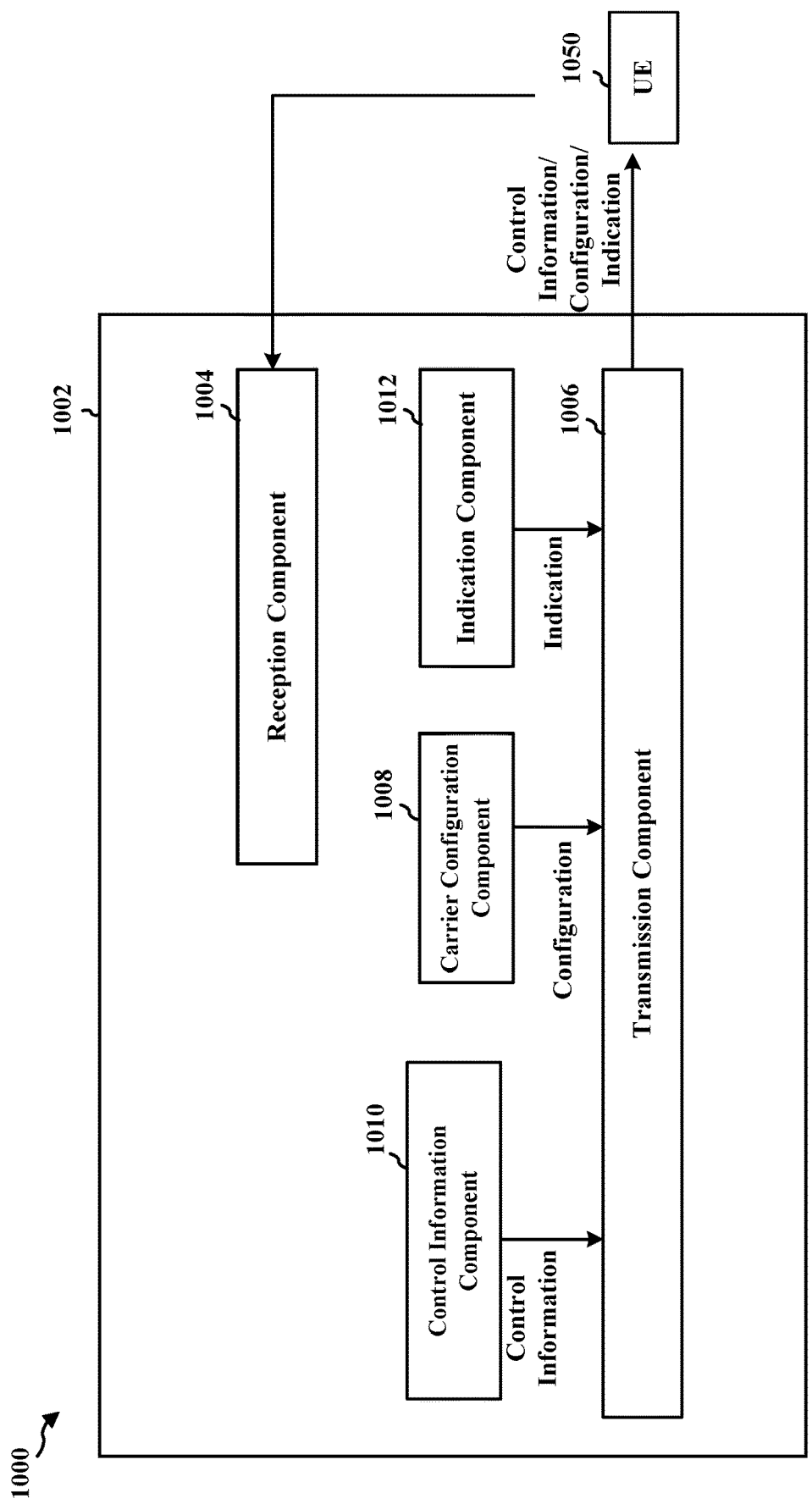
FIG. 10 is a conceptual data flow diagram illustrating the data flow between different means/components in an example apparatus.

FIG. 10 is a conceptual data flow diagram 1000 illustrating the data flow between different means/components in an example apparatus 1002. The apparatus may be a base station (e.g., the base station 102/180, 502, 750; the apparatus 1002/1002'; the processing system 1114, which may include the memory 376 and which may be the entire apparatus 1002/1002' or a component of the apparatus 1002/1002', such as the TX processor 316, the RX processor 370, and/or the controller/processor 375). The apparatus includes a reception component 1004. The apparatus includes a carrier configuration component 1008 that is configured to configuring a UE for a plurality of carriers, e.g., as described in connection with 902 in FIG. 9. The apparatus includes a control information component 1010 that is configured to transmit control information to the UE in a MAC-CE, e.g., as described in connection with 904 from FIG. 9. The control information may comprise at least one of a TCI state, an CSI-RS resource configuration, or an SRS resource configuration or a PUCCH spatial relation indication. The apparatus includes an indication component 1012 that is configured to provide an indication to the UE that the control information is to be applied to multiple carriers of the plurality of carriers, e.g., as described in connection with 906 from FIG. 9.

The apparatus may include additional components that perform each of the blocks of the algorithm in the aforementioned flowcharts of FIGS. 5 and 9. As such, each block in the aforementioned flowcharts of FIGS. 5 and 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
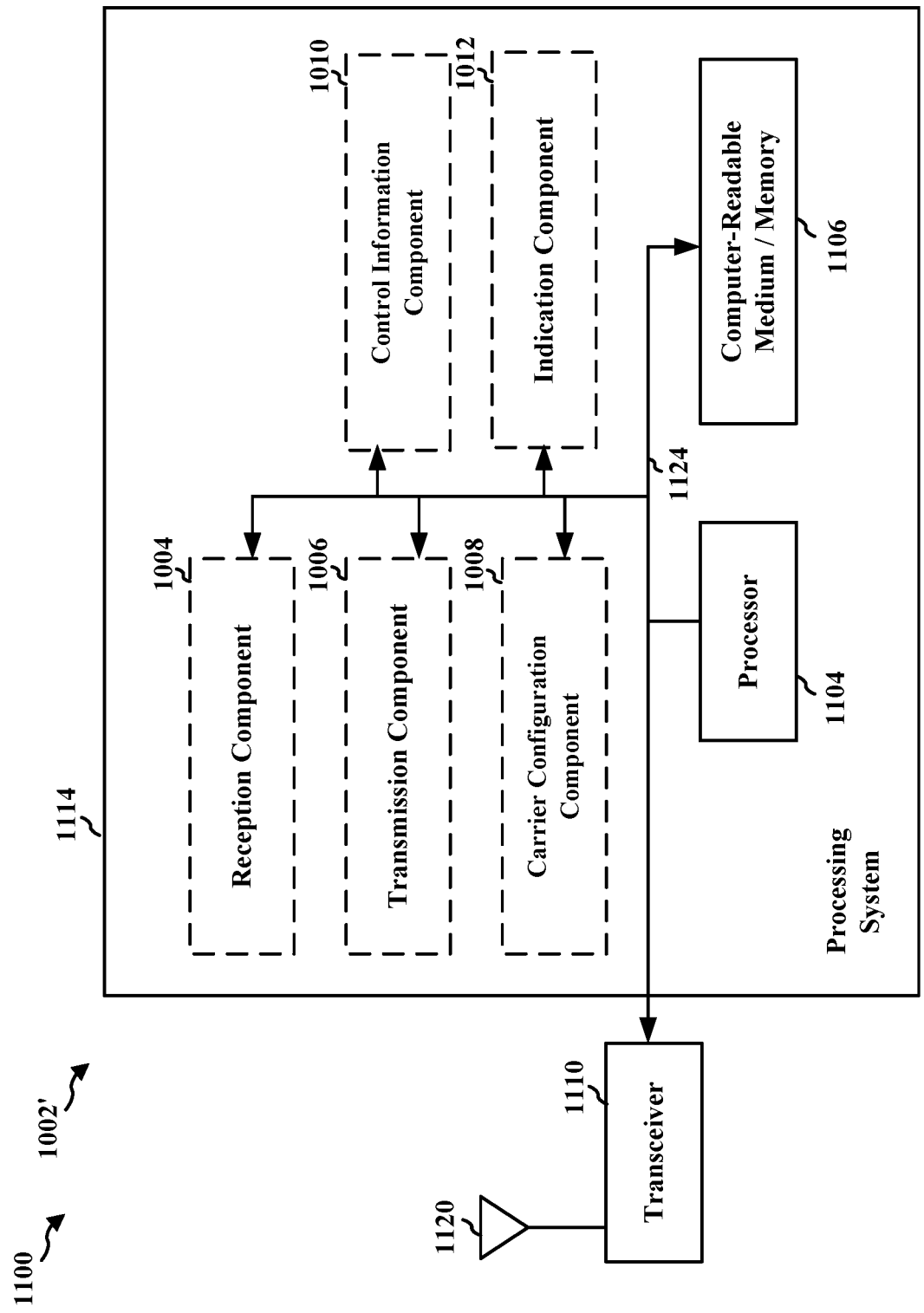
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1006, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, and. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for configuring a UE for a plurality of carriers. The apparatus may include means for transmitting control information to the UE, where the control information comprises at least one of a TCI state, an CSI-RS resource configuration, or an SRS resource configuration. The apparatus may include means for providing an indication to the UE that the control information is to be applied to multiple carriers of the plurality of carriers. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and aspects thereof may be combined with aspects of other examples or teachings described herein, without limitation.

Example 1 is a method of wireless communication at a UE, comprising: receiving a configuration for each of a plurality of carriers; receiving control information comprised in a MAC-CE; determining whether the control information applies to multiple carriers from among the plurality of carriers; and applying the control information to at least one of the plurality of carriers based on a determination of whether the control information applies to multiple carriers from among the plurality of carriers.

In Example 2, the method of Example 1 further includes that the control information comprises at least one of a TCI state, a CSI-RS resource configuration, a SRS resource configuration, or a PUCCH spatial relation indication.

In Example 3, the method of Example 1 or Example 2 further includes that the control information comprises a carrier indicator that indicates multiple carriers from among the plurality of carriers, and wherein the UE applies the control information to the multiple carriers indicated by the carrier indicator.

In Example 4, the method of any of Examples 1-3 further includes that the carrier indicator comprises a carrier bit index.

In Example 5, the method of any of Examples 1-4 further includes that the multiple carriers are indicated using least significant bits of the carrier bit index.

In Example 6, the method of any of Examples 1-5 further includes receiving a component carrier list from a base station indicating a set of carriers from among the plurality of carriers to apply the control information in the MAC-CE, wherein the UE determines whether to apply the control information to the set of carriers from among the plurality of carriers based on the synchronization indication.

In Example 7, the method of any of Examples 1-6 further includes that the synchronization indication comprises a serving cell index for each carrier in the set of carriers.

In Example 8, the method of any of Examples 1-7 further includes that the synchronization indication is received in RRC message.

In Example 9, the method of any of Examples 1-8 further includes that the synchronization indication is comprised in an IE in the RRC message.

In Example 10, the method of any of Examples 1-9 further includes that the control information comprises the TCI state, and wherein the UE applies the TCI state to multiple carriers from among the plurality of carriers.

In Example 11, the method of any of Examples 1-10 further includes that the control information comprises the CSI-RS resource configuration, and wherein the UE applies the TCI state to multiple carriers from among the plurality of carriers.

In Example 12, the method of any of Examples 1-11 further includes that the control information comprises the SRS resource configuration, and wherein the UE applies the TCI state to multiple carriers from among the plurality of carriers.

In Example 13, the method of any of Examples 1-12 further includes receiving a synchronization indication from a base station indicating whether to apply the control information in the MAC-CE to the plurality of carriers, wherein the UE determines whether to apply the control information to multiple carriers from among the plurality of carriers based on the synchronization indication.

In Example 14, the method of any of Examples 1-13 further includes that the UE applies the control information to each of the plurality of carriers when the synchronization indication indicates to apply the spatial synchronization.

In Example 15, the method of any of Examples 1-14 further includes that the UE applies the control information to a single carrier from among the plurality of carriers when the synchronization indication indicates not to apply the spatial synchronization.

In Example 16, the method of any of Examples 1-15 further includes that the synchronization indication is received in RRC message.

In Example 17, the method of any of Examples 1-16 further includes that the synchronization indication is comprised in an IE in the RRC message.

Example 18 is a device including one or more processors and one or more memories in electronic communication with the one or more processors storing instructions executable by the one or more processors to cause the device to implement a method as in any of Examples 1-17.

Example 19 is a system or apparatus including means for implementing a method or realizing an apparatus as in any of Examples 1-17.

Example 20 is a non-transitory computer readable medium storing instructions executable by one or more processors to cause the one or more processors to implement a method as in any of Examples 1-17.

Example 21 is a method of wireless communication at a base station, comprising: configuring a U) for a plurality of carriers; transmitting control information to the UE in a MAC-CE; and providing an indication to the UE that the control information is to be applied to multiple carriers of the plurality of carriers.

In Example 22, the method of Example 21 further includes that the control information comprises at least one of a TCI state, a CSI-RS resource configuration, a SRS resource configuration, or a PUCCH spatial relation indication.

In Example 23, the method of Example 21 or Example 22 further includes that the indication comprises a carrier indicator comprised in the MAC-CE that indicates the multiple carriers from among the plurality of carriers.

In Example 24, the method of any of Examples 21-23 further includes that the carrier indicator comprises a carrier bit index.

In Example 25, the method of any of Examples 21-24 further includes that the multiple carriers are indicated using least significant bits of the carrier bit index.

In Example 26, the method of any of Examples 21-25 further includes that the indication comprises a component carrier list indicating a set of carriers from among the plurality of carriers to apply the control information in the MAC-CE.

In Example 27, the method of any of Examples 21-26 further includes that the synchronization indication is transmitted in radio resource control (RRC) message.

In Example 28, the method of any of Examples 21-27 further includes that the synchronization indication is comprised in an information element (IE) in the RRC message.

In Example 29, the method of any of Examples 21-28 further includes that the indication comprises a synchronization indication indicating a set of carriers from among the plurality of carriers to apply a spatial synchronization.

In Example 30, the method of any of Examples 21-29 further includes that the synchronization indication comprises a serving cell index for each carrier in the set of carriers.

In Example 31, the method of any of Examples 21-30 further includes that the synchronization indication is transmitted in radio resource control (RRC) message.

In Example 32, the method of any of Examples 21-31 further includes that the synchronization indication is comprised in an information element (IE) in the RRC message.

In Example 33, the method of any of Examples 21-32 further includes that the control information comprises the TCI state.

In Example 34, the method of any of Examples 21-33 further includes that the control information comprises the CSI-RS resource configuration.

In Example 35, the method of any of Examples 21-34 further includes that the control information comprises the SRS resource configuration.

Example 36 is a device including one or more processors and one or more memories in electronic communication with the one or more processors storing instructions executable by the one or more processors to cause the device to implement a method as in any of Examples 21-35.

Example 37 is a system or apparatus including means for implementing a method or realizing an apparatus as in any of Examples 21-35.

Example 38 is a non-transitory computer readable medium storing instructions executable by one or more processors to cause the one or more processors to implement a method as in any of Examples 21-35.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a radio resource control (RRC) configuration of a set of serving cells;
   receiving a medium access control-control element (MAC-CE) that indicates at least one of a transmission configuration indication (TCI) state or a spatial relation and further indicates a cell index for a single serving cell included in the set of serving cells indicated in the RRC configuration; and
   applying the TCI state or the spatial relation indicated in the MAC-CE to each serving cell in the set of serving cells based on the cell index in the MAC-CE being for the single serving cell that is included in the set of serving cells configured in the RRC configuration.

2. The method of claim 1, wherein the MAC-CE further indicates at least one of a channel state information reference signal (CSI-RS) resource configuration or a sounding reference signal (SRS) resource configuration for the set of serving cells.

3. The method of claim 1, wherein the RRC configuration indicates the set of serving cells in a list that comprises a serving cell index for each serving cell in the set of serving cells.

4. The method of claim 3, wherein the list is comprised in an information element (IE) of a cell group configuration in an RRC message.

5. The method of claim 1, wherein the MAC-CE indicates the TCI state and wherein the TCI state is applied to each of the set of serving cells based on the cell index in the MAC-CE corresponding to one serving cell of the set of serving cells configured in the RRC configuration.

6. The method of claim 1, wherein the MAC-CE further comprises a channel state information reference signal (CSI-RS) resource configuration, and wherein the CSI-RS resource configuration is applied to each of the set of serving cells.

7. The method of claim 1, wherein the MAC-CE further comprises a sounding reference signal (SRS) resource configuration, and wherein the SRS resource configuration is applied to each of the set of serving cells.

8. The method of claim 1, wherein the MAC-CE indicates the spatial relation for uplink transmissions, and wherein the spatial relation is applied to each serving cell of the set of serving cells based on the cell index in the MAC-CE corresponding to one of the set of serving cells configured in the RRC configuration.

9. The method of claim 1, wherein applying the TCI state or the spatial relation indicated in the MAC-CE includes applying the TCI state for reception of a physical downlink shared channel (PDSCH).

10. The method of claim 1, wherein applying the TCI state or the spatial relation indicated in the MAC-CE includes applying the spatial relation for transmission of uplink communication.

11. The method of claim 1, wherein the RRC configuration is for automatic application of the TCI state or the spatial relation for other serving cells indicated in the set of serving cells when the MAC-CE is received that indicates one serving cell in the set of serving cells without receiving additional indications for the other serving cells in the MAC-CE.

12. The method of claim 1, wherein the RRC configuration indicates the set of serving cells to which to apply at least one of the TCI state or the spatial relation indicated by the MAC-CE.

13. A method of wireless communication at a base station, comprising:
configuring a user equipment (UE) with a radio resource control (RRC) configuration of a set of serving cells; and
transmitting a medium access control-control element (MAC-CE) that indicates at least one of a transmission configuration indication (TCI) state or a spatial relation and further indicates a cell index for a single serving cell included in the set of serving cells indicated in the RRC configuration to switch the TCI state or the spatial relation for each serving cell in the set of serving cells.

14. The method of claim 13, wherein the MAC-CE further indicates a channel state information reference signal (CSI-RS) resource configuration or a sounding reference signal (SRS) resource configuration for the set of serving cells.

15. The method of claim 13, wherein the RRC configuration indicates the set of serving cells in a list that comprises a serving cell indicate for each serving cell in the set of serving cells, and wherein the MAC-CE includes a single serving cell index that indicates one serving cell from a set of serving cell indexes indicated in the list.

16. The method of claim 15, wherein the list is indicated in an information element (IE) of a cell group configuration in an RRC message.

17. The method of claim 13, wherein the MAC-CE indicates the TCI state.

18. The method of claim 13, wherein the MAC-CE comprises a channel state information reference signal (CSI-RS) resource configuration for the set of serving cells configured in the RRC configuration.

19. The method of claim 13, wherein the MAC-CE comprises a sounding reference signal (SRS) resource configuration for the set of serving cells configured in the RRC configuration.

20. The method of claim 13, wherein the MAC-CE indicates the spatial relation.

21. The method of claim 13, wherein the RRC configuration is for automatic application of the TCI state or the spatial relation for other serving cells indicated in the set of serving cells when the MAC-CE is received that indicates one serving cell in the set of serving cells without receiving additional indications for the other serving cells in the MAC-CE.

22. An apparatus for wireless communication at a user equipment (UE), comprising:
memory; and
at least one processor coupled to the memory and configured to:
receive a radio resource control (RRC) configuration of a set of serving cells;
receive a medium access control-control element (MAC-CE) that indicates at least one of a transmission configuration indication (TCI) state or a spatial relation and further indicates a cell index for a single serving cell included in the set of serving cells indicated in the RRC configuration; and
apply the TCI state or the spatial relation indicated in the MAC-CE to each serving cell in the set of serving cells based on the cell index in the MAC-CE being for the single serving cell that is included in the set of serving cells configured in the RRC configuration.

23. The apparatus of claim 22, wherein the RRC configuration indicates the set of serving cells in a list that comprises a serving cell index for each serving cell in the set of serving cells.

24. The apparatus of claim 23, wherein the list is comprised in an information element (IE) of a cell group configuration in an RRC message.

25. The apparatus of claim 22, wherein the MAC-CE indicates the TCI state and wherein the TCI state is applied to each of the set of serving cells based on the cell index in the MAC-CE corresponding to one serving cell of the set of serving cells configured in the RRC configuration.

26. The apparatus of claim 22, wherein the MAC-CE indicates the spatial relation for uplink transmissions, and wherein the spatial relation is applied to each serving cell of the set of serving cells based on the cell index in the MAC-CE corresponding to one of the set of serving cells configured in the RRC configuration.

27. The apparatus of claim 22, wherein application of the TCI state or the spatial relation indicated in the MAC-CE includes use of the TCI state for reception of a physical downlink shared channel (PDSCH).

28. The apparatus of claim 22, wherein application of the TCI state or the spatial relation indicated in the MAC-CE includes use of the spatial relation for transmission of uplink communication.

29. The apparatus of claim 22, wherein the RRC configuration is for automatic application of the TCI state or the spatial relation for other serving cells indicated in the set of serving cells when the MAC-CE is received that indicates one serving cell in the set of serving cells without receiving additional indications for the other serving cells in the MAC-CE.

30. The apparatus of claim 22, wherein the RRC configuration indicates the set of serving cells to which to apply at least one of the TCI state or the spatial relation indicated by the MAC-CE.

31. An apparatus for wireless communication at a base station, comprising:
memory; and
at least one processor coupled to the memory and configured to:
configure a user equipment (UE) with a radio resource control (RRC) configuration of a set of serving cells; and
transmit a medium access control-control element (MAC-CE) that indicates at least one of a transmission configuration indication (TCI) state or a spatial relation and further indicates a cell index for a single serving cell included in the set of serving cells indicated in the RRC configuration to switch the TCI state or the spatial relation for each serving cell in the set of serving cells.

32. The apparatus of claim 31, wherein the RRC configuration indicates the set of serving cells in a list that comprises a serving cell indicate for each serving cell in the set of serving cells, and wherein the MAC-CE includes a single serving cell index that indicates one serving cell from a set of serving cell indexes indicated in the list.

33. The apparatus of claim 32, wherein the list is indicated in an information element (IE) of a cell group configuration in an RRC message.

34. The apparatus of claim 31, wherein the MAC-CE indicates the TCI state.

35. The apparatus of claim 31, wherein the MAC-CE indicates the spatial relation.

* * * * *